United States Patent
Martynov et al.

(10) Patent No.: US 6,510,200 B1
(45) Date of Patent: Jan. 21, 2003

(54) MULTI-LAYER STRUCTURE WITH VARIABLE BANDPASS FOR MONOCHROMATIZATION AND SPECTROSCOPY

(75) Inventors: Vladimir V. Martynov, Troy, MI (US); Yuriy Platonov, Troy, MI (US)

(73) Assignee: Osmic, Inc., Auburn Hills, MI (US)

( * ) Notice: Subject to any disclaimer, the term of this patent is extended or adjusted under 35 U.S.C. 154(b) by 0 days.

(21) Appl. No.: 09/896,458

(22) Filed: Jun. 29, 2001

(51) Int. Cl.[7] .................................................. G21K 1/06
(52) U.S. Cl. ............................ 378/84; 378/49; 378/85
(58) Field of Search ............................. 378/44, 45, 49, 378/82, 84, 85; 359/572, 576, 575; 250/237 G

(56) References Cited

U.S. PATENT DOCUMENTS

| | | | | |
|---|---|---|---|---|
| 3,980,883 A | * | 9/1976 | Franks | 378/84 |
| 4,525,853 A | | 7/1985 | Keem et al. | 378/84 |
| 4,643,951 A | | 2/1987 | Keem et al. | 428/469 |
| 4,656,347 A | * | 4/1987 | Une et al. | 250/548 |
| 4,675,889 A | | 6/1987 | Wood et al. | 378/84 |
| 4,693,933 A | | 9/1987 | Keem et al. | 428/333 |
| 4,716,083 A | | 12/1987 | Eichen et al. | 428/453 |
| 4,717,632 A | | 1/1988 | Keem et al. | 428/698 |
| 4,724,169 A | | 2/1988 | Keem et al. | 427/249.5 |
| 4,727,000 A | | 2/1988 | Ovshinsky et al. | 428/635 |
| 4,728,193 A | * | 3/1988 | Bartelt et al. | 356/509 |
| 4,777,090 A | | 10/1988 | Ovshinsky et al. | 428/408 |
| 4,783,374 A | | 11/1988 | Custer et al. | 428/447 |
| 4,785,470 A | | 11/1988 | Wood et al. | 378/84 |
| 4,867,785 A | | 9/1989 | Keem et al. | 75/333 |
| 5,082,621 A | | 1/1992 | Wood | 376/458 |
| 5,167,912 A | | 12/1992 | Wood | 376/458 |
| 5,384,817 A | * | 1/1995 | Crowther et al. | 378/84 |
| 5,646,976 A | | 7/1997 | Gutman | 378/84 |
| 5,757,882 A | | 5/1998 | Gutman | 378/84 |
| 5,799,056 A | | 8/1998 | Gutman | 378/84 |
| 6,014,423 A | | 1/2000 | Gutman et al. | 378/85 |
| 6,041,099 A | | 3/2000 | Gutman et al. | 378/85 |
| 6,069,934 A | | 5/2000 | Verman et al. | 378/84 |
| 6,330,301 B1 | | 12/2001 | Jiang | 378/84 |
| 6,389,100 B1 | | 5/2002 | Verman et al. | 378/84 |
| 6,421,417 B1 | | 7/2002 | Jiang et al. | 378/84 |

OTHER PUBLICATIONS

A.I. Erko et al., "Multilayer Gratings Efficiency: Numerical and Physical Experiments," Nuclear Instruments and Method in Physics Research, A 333, 1993, pp. 599–606.

V. Martynov et al., "Comparison of Modal and Differential Methods for Multilayer Gratings," Nuclear Instruments and Method in Physics Research, A 339, 1994, pp. 617–625.

A. Erko et al., "Multilayer Diffraction Grating Properties," J. Phys. III France vol. 4, 1994, pp. 1649–1658.

V.V. Martynov et al., "Lamellar Multilayer Gratings with Very High Diffraction Efficiency", SPIE vol. 3150, 1997, pp. 2–8.

A. Sammar et al., "Narrow Bandpass Multilayer X-Ray Monochromator," Rev. Sci. Instrum. vol. 68, No. 8, Aug. 1997, pp. 2969–2972.

* cited by examiner

*Primary Examiner*—David P. Porta
*Assistant Examiner*—Therese Barber
(74) *Attorney, Agent, or Firm*—Brinks Hofer Gilson & Lione

(57) ABSTRACT

A grating that includes a multilayer structure that has alternating layers of materials, a plurality of grooves formed between a plurality of lands, wherein at least one structural parameter of the plurality of grooves and plurality of lands is formed randomly in the multilayer structure.

27 Claims, 2 Drawing Sheets

MULTI-LAYER STRUCTURE WITH VARIABLE BANDPASS FOR MONOCHROMATIZATION AND SPECTROSCOPY

BACKGROUND OF THE INVENTION

1. Field of the Invention

The present invention relates to multi-layer gratings/mirrors and their application in analyzing systems.

2. Discussion of Related Art

It is well known in the art to use large d-spacing artificially grown crystals, e.g. PET crystals, for x-ray fluorescence spectroscopy. Such artificial crystals are very sensitive to the environment and degrade quickly under the influence of radiation, heat, moisture, etc. Accordingly, the artificial crystals do not last long and are difficult to use. In hard x-rays region (wavelength less than 0.2 nm) ordinary crystals, e.g. Si or Ge crystals, when used in monochromators and spectrometers in some cases have resolving powers that are too high (~104) and cut out too much useful flux. Accordingly, the measurement times become longer.

While reflective gratings can be used in place of the artificial crystals, such gratings suffer from low diffraction efficiency in the softer x-ray region (wavelengths ranging from about 0.2 nm to about 1.2 nm). Multilayer mirrors, while improving reflection efficiency relative to the gratings in a wide wavelengths range (from 1 nm to 20 nm), have a resolving power that is too low $\sim\lambda/\Delta\lambda \sim 10$–$100$.

Multilayer gratings/mirrors are well known in the art and are very stable, durable and are easy in use. Examples of such multilayer gratings/mirrors are described in U.S. Pat. Nos. 4,727,000; 5,646,976 and 5,757,882, the entire contents of each are hereby incorporated herein by reference. It is well known that the bandpass of such multilayer gratings/mirrors is defined by the number of bilayers in which the incident wave penetrates. This number of bilayers in the multilayer grating/mirror is limited by the factor that due to interference in, the periodical structure of the multiple layers stacked upon one another, the radiation wave incident on the multilayer grating/mirror is reflected back and does not penetrate any deeper than a so-called extinction depth. The extinction depth is determined by the wavelength of the incident radiation and the materials of the multilayer grating/mirror.

The bandpass and correspondingly the resolution of a spectrometer or a monochromator that uses a multilayer grating/mirror is proportional to:

$$\Delta\lambda/\lambda \sim 1/N, \quad (1)$$

wherein N is the number of multilayer periods present within the extinction depth. In many instances, the resolution of a spectrometer or a monochromator is required to be better than that as determined by the extinction depth in the manner described above.

Based on the above relationship, one way to increase the resolution of a multilayer grating/mirror is to increase the extinction depth and thus the number N of multilayer periods within the extinction depth. One known way to increase the extinction depth is to etch grooves in the multilayer grating/mirror and remove part of the reflection planes so as to allow the incidence radiation wave to penetrate deeper into the multilayer grating. As a result, the number of layer N in the extinction depth increases and the bandpass, or the resolution, increases in accordance with equation (1) above. Such a multilayer grating/mirror is discussed in the paper entitled "Lamellar Multilayer Gratings with Very High Diffraction Efficiency," V.V. Martynov et al., SPIE Vol. 3150 0277-786X/97, pp. 2–8.

By changing the groove/period ratio of the multilayer grating/mirror, the amount of removed material can be continuously varied and, thus, the extinction depth and resolution can be continuously varied. The maximum practical factor in the bandpass variation is defined by technological limits and, for different wavelength, can be as from 1 to 100. While such a multilayer grating/mirror provides increased resolution, the multilayer grating/mirror with periodically spaced lands also generates many diffraction orders, which contribute in making the detector signal to have a small signal to noise ratio. The generation of multiple diffraction orders is shown by analogy to the single layer periodic transmission grating diffraction intensity distribution shown in FIG. 3. Obviously, if a single layer transmission grating with a periodic structure generates multiple diffraction orders, then a multi-layer transmission grating with a periodic structure will also generate multiple diffraction orders.

Accordingly, it is an objective of the present invention to provide a multilayer grating/mirror that for a wide range of wavelengths has increased resolution and diffraction efficiency while at the same time contributing in making the detector signal having a large signal to noise ratio.

Another object of the present invention is to provide crystals that are not sensitive to the environment and do not degrade quickly when used in an analyzing system.

SUMMARY OF THE INVENTION

One aspect of the present invention regards an analyzing system that includes a radiation generator that generates a beam of radiation along a first direction and a grating that receives the beam of radiation and generates a second beam of radiation that possesses only a zeroth order of diffraction. An object receives the second beam of radiation and generates a third beam of radiation and a detector system that receives the third beam of radiation.

A second aspect of the present invention regards a grating that includes a multilayer structure that has alternating layers of materials, a plurality of grooves formed between a plurality of lands, wherein at least one structural parameter of the plurality of grooves and plurality of lands is formed randomly in the multilayer structure.

An advantage of each aspect of the present invention is to provide crystals that are not sensitive to the environment and do not degrade quickly when used in an analyzing system.

A second advantage of each aspect of the present invention to provide a multilayer grating/mirror that has increased resolution and diffraction efficiency while at the same time contributing in making the detector signal having a large signal to noise ratio.

Additional objects and advantages of the invention will become apparent from the following description and the appended claims when considered in conjunction with the accompanying drawings.

DETAILED DESCRIPTION OF THE PREFERRED EMBODIMENTS

Figure 1:
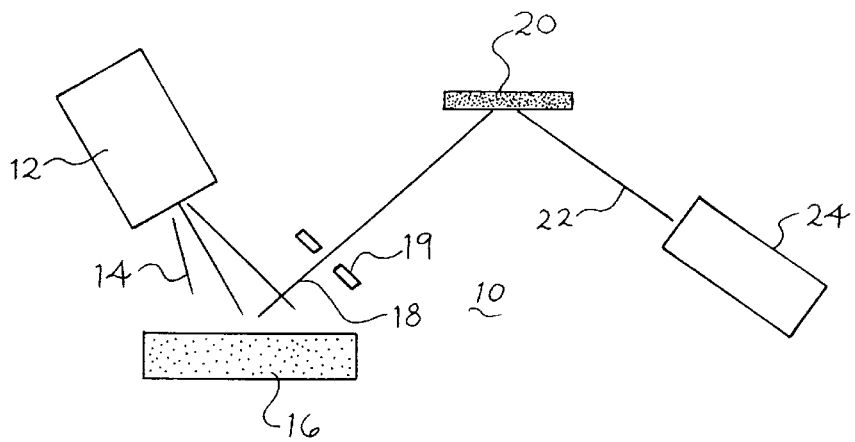
FIG. 1 schematically shows an embodiment of an x-ray fluoroscopy system according to the present invention.

As shown in FIG. 1, an x-ray fluoroscopy analyzing system 10 includes a radiation generator or source, such as x-ray tube 12, that generates a beam of radiation along a first direction, such as a beam of x-rays 14. The x-rays 14 have a wavelength that ranges from 0.3–1.0 nm. The x-rays 14 generated from x-ray tube 12 are received by and interact with the object or sample 16 so that x-ray fluorescence radiation 18 is generated from the object 16. The x-rays 18 are directed through a slit 19 and received by a multilayer grating/mirror 20, which reflects only a zeroth order of diffraction of x-rays 22 of a particular wavelength, such as 0.71 nm. The x-rays 22 are then received by a detector system 24, such as a proportional counter detector. The detected radiation is then analyzed in a well known manner.

Figure 2:
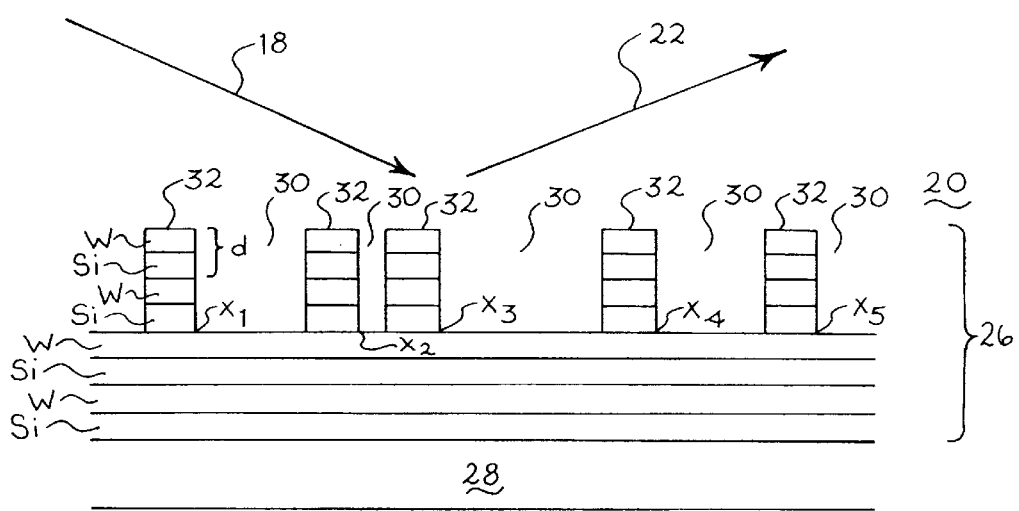
FIG. 2 schematically shows a side cross-sectional view of an embodiment of a multilayer grating/mirror according to the present invention to be used with the x-ray fluoroscopy system of FIG. 1.
Figure 3:
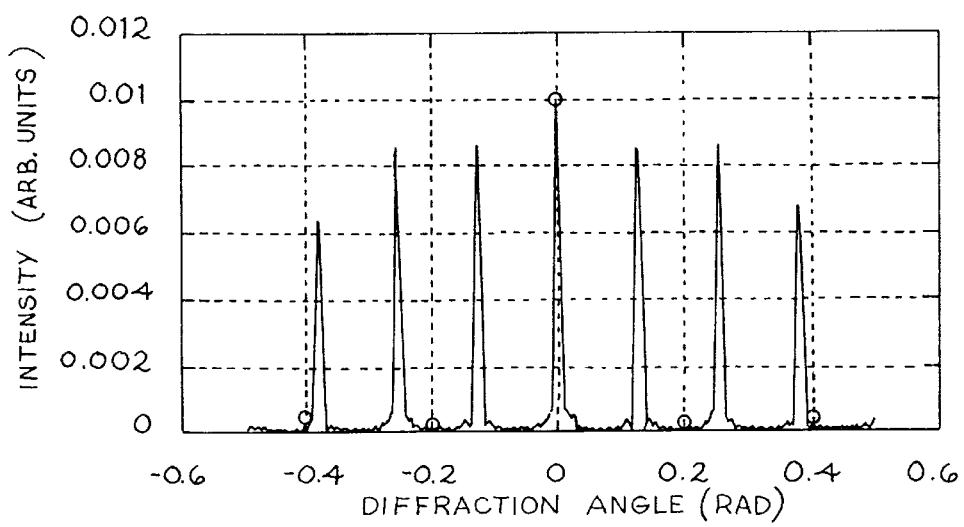
FIG. 3 shows a diffraction intensity distribution from a periodical grating, giving many diffraction orders.

As shown in FIG. 2, the multilayer grating/mirror 20 includes a multilayer structure 26 deposited on a substrate 28. The multilayer structure 26 is made out of alternating layers of materials with large and small atomic numbers. The material with large atomic number can be selected from the materials W, Ni, Fe, Mo, V, Cr and the material with small atomic numbers can be selected from the materials C, Si, B4C. For example, the multilayer structure 26 can be made out of alternating layers of W (10 Å) and C (10 Å) layers. Thus, the period, d, of the alternating W and C layers is 20 Å. In this embodiment, the number of periods, d, of alternating W/C bi-layers in the multilayer structure 26 is 500. Note that the number of bi-layer depends on a spectral resolution/bandpass requirements. For 500 bi-layers, the bandpass$\lambda/\Delta\lambda \sim N \sim 500$. The period of the multilayer depends on a required Bragg angle and typically ranges from 15 A to 100 A for different wavelengths. In addition, other materials and thicknesses for the layers of materials with large and small atomic numbers are possible depending on the specific needs for wavelength and Bragg angle.

As shown in FIG. 2, a plurality of grooves 30 are formed randomly on the multilayer grating/mirror 20. The grooves 30 are positioned between lands 32 of the multilayer structure 26, wherein each land 32 has a width of approximately 1 micron and contains 500 periods of alternating W/Si bilayers. The starting points or positions xi of the lands 30 can be determined by a formula given below:

$$xi=(d*i)+[ki*(d-Wland)], \qquad (2)$$

where d=effective period of the grating/mirror 20, i=1, 2, 3, ... ,; Wland=width of land and ki=a random number from 0 to 1. Note that the widths of the lands and depths of the grooves are constant for the entire area of the grating. Furthermore, the lands are placed randomly inside each period according to the formula (2) above.

Figure 4:
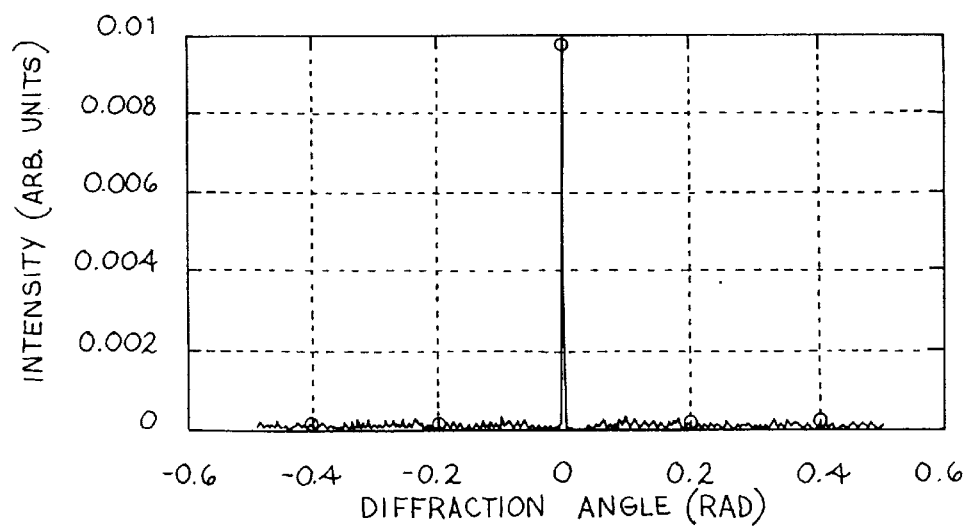
FIG. 4 shows a diffraction intensity distribution from a single layer grating with random line spacing where all diffraction orders are suppressed.

One of the benefits of using a multilayer grating/mirror 20 with a random pattern of grooves is that all diffraction orders, except the zeroth order, are suppressed. In other words, only the direct beam is reflected by the grating/mirror 20. The suppression of diffraction orders is shown by analogy to the single layer random structure transmission grating diffraction intensity distribution shown in FIG. 4. Obviously, if a single layer transmission grating with a random structure suppresses multiple diffraction orders, then a multi-layer transmission grating with a random structure will also suppress multiple diffraction orders.

In the above-described mode of randomizing the grating/mirror 20, the land widths and the grooves depths are selected so that a desired width of the peak of the rocking curve of the grating/mirror 20, which is the same as an energy bandpass or spectral resolution of the grating/mirror 20, is achieved. Thus, the ability to change the bandpass allows the spectral resolution to be adjusted to specific requirements and so as to optimize flux and resolution.

While the above description constitutes the preferred embodiments of the present invention, it will be appreciated that the invention is susceptible of modification, variation and change without departing from the proper scope and fair meaning of the accompanying claims. For example, the grating 20 can also be used as a monochromator.

We claim:

1. An analyzing system comprising:

a radiation generator that generates a beam of radiation along a first direction;

an object that receives said beam of radiation and generates a second beam of radiation;

a grating that receives said second beam of radiation and generates a third beam of radiation that possesses only a zeroth order of diffraction; and a detector system that receives said third beam of radiation.

2. The analyzing system of claim 1, wherein said radiation generator comprises an x-ray source that generates a beam of x-rays.

3. The analyzing system of claim 1, wherein said grating comprises a multilayer structure.

4. The analyzing system of claim 3, wherein said multilayer structure comprises alternating layers of materials with large and small atomic numbers.

5. The analyzing system of claim 4, wherein said material with a large atomic number is tungsten and said material with a small atomic number is silicon.

6. The analyzing system of claim 3, wherein said multilayer structure comprises a plurality of grooves formed between a plurality of lands.

7. The analyzing system of claim 6, wherein each of said lands has an equal number of layers of said multilayer structure.

8. The analyzing system of claim 6, wherein said plurality of lands are formed randomly in said multilayer structure.

9. The analyzing system of claim 8, wherein each of said plurality of lands has a constant width.

10. The analyzing system of claim 8, wherein the depth of each of said plurality of grooves is constant.

11. The analyzing system of claim 9, wherein the depth of each of said plurality of grooves is constant.

12. The analyzing system of claim 8, where the starting positions xi of said plurality of lands are determined by the formula given below:

$$xi=(d*i)+[ki*(d-Wland)],$$

where d=period of said grating, i=1, 2, 3, ... ; Wland=width of land; and ki=a random number from 0 to 1.

13. The analyzing system of claim 12, wherein the widths of each of said lands is constant.

14. The analyzing system of claim 12, wherein the widths of each of said lands is constant.

15. The analyzing system of claim 13, wherein the widths of each of said lands is constant.

16. A grating comprising:
  a multilayer structure comprising:
    alternating layers of materials;
    a plurality of grooves formed between a plurality of lands, wherein at least one structural parameter of said plurality of grooves and plurality of lands is formed randomly in said multilayer structure.

17. The grating of claim 16, wherein said alternating layers of materials comprise alternating layers of materials with large and small atomic numbers.

18. The grating of claim 17, wherein said material with a large atomic number is tungsten and said material with a small atomic number is silicon.

19. The grating of claim 16, wherein each of said lands has an equal number of layers of said multilayer structure.

20. The grating of claim 16, wherein said at least one parameter is the location of said plurality of grooves.

21. The grating of claim 20, wherein each of said plurality of lands has a constant width.

22. The grating of claim 20, wherein the depth of each of said plurality of grooves is constant.

23. The grating of claim 21, wherein the depth of each of said plurality of grooves is constant.

24. The grating of claim 20, where the starting positions $x_i$ of said plurality of lands are determined by the formula given below:

$$x_i = (d*i) + [k_i*(d - W\text{land})],$$

where d=period of said grating, i=1, 2, 3, ...; Wland=width of land; and ki=a random number from 0 to 1.

25. The grating of claim 24, wherein the widths of each of said grooves is constant.

26. The grating of claim 24, wherein the widths of each of said lands is constant.

27. The grating of claim 25, wherein the widths of each of said lands is constant.

* * * * *

UNITED STATES PATENT AND TRADEMARK OFFICE
CERTIFICATE OF CORRECTION

PATENT NO.   : 6,510,200 B1
DATED        : January 21, 2003
INVENTOR(S)  : Vladimir V. Martynov et al.

It is certified that error appears in the above-identified patent and that said Letters Patent is hereby corrected as shown below:

Title page,
Item [56], U.S. PATENT DOCUMENTS, delete "7/1985" and substitute -- 6/1985 -- in its place.
Item [57], ABSTRACT,
Line 1, before "A grating" insert -- An analyzing system comprised of a radiation source that produces a beam of radiation of various wavelength, a sample that receives and reflects the incident beam to a grating, a grating that suppresses all of the diffracted beams except the zero order, and a detection system that detects only the zero order. --.

Column 1,
Line 22, delete "(~104)" and substitute -- (~$10^4$) -- in its place.

Signed and Sealed this

Twenty-eighth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,510,200 B1
DATED         : January 21, 2003
INVENTOR(S)   : Vladimir V. Martynov et al.

It is certified that error appears in the above-identified patent and that said Letters Patent is hereby corrected as shown below:

Delete claims 16 through 27.

Signed and Sealed this

Twenty-seventh Day of April, 2004

JON W. DUDAS
*Acting Director of the United States Patent and Trademark Office*